United States Patent

Schmid et al.

[11] Patent Number: 5,829,517
[45] Date of Patent: Nov. 3, 1998

[54] FLOW MODULE

[75] Inventors: Ottmar Schmid, Markdorf; Harald Nigsch, Weingarten, both of Germany

[73] Assignee: Daimler-Benz AG, Germany

[21] Appl. No.: 850,931

[22] Filed: May 2, 1997

[30] Foreign Application Priority Data

May 2, 1996 [DE] Germany ................... 196 17 396.5

[51] Int. Cl.$^6$ ....................................................... F28F 3/08
[52] U.S. Cl. ................... 165/167; 165/DIG. 366
[58] Field of Search ................. 165/167, DIG. 366

[56] References Cited

U.S. PATENT DOCUMENTS

| | | | |
|---|---|---|---|
| 1,056,385 | 3/1913 | Walker | 165/167 |
| 1,770,254 | 7/1930 | Seligman | 165/167 X |
| 2,160,928 | 6/1939 | Voorhees | 165/167 |
| 2,229,306 | 1/1941 | Prestage | 165/167 |
| 2,528,013 | 10/1950 | Morris | 165/167 |
| 4,403,652 | 9/1983 | Schiltz et al. | 165/167 |
| 4,893,673 | 1/1990 | Rosman et al. | 165/167 |
| 5,685,368 | 11/1997 | Yuasa et al. | 165/167 |

FOREIGN PATENT DOCUMENTS

| | | | |
|---|---|---|---|
| 762960 | 8/1971 | Belgium | 165/167 |
| 203213 | 12/1986 | European Pat. Off. | |
| 487931 | 6/1992 | European Pat. Off. | |
| 578933 | 1/1994 | European Pat. Off. | |
| 653877 | 10/1935 | Germany | 165/167 |
| 1 501 617 | 3/1965 | Germany | |
| 3434415 | 3/1986 | Germany | |
| 230991 | 9/1989 | Japan | |
| 177791 | 8/1991 | Japan | |
| 732637 | 6/1955 | United Kingdom | 165/167 |

*Primary Examiner*—Leonard R. Leo
*Attorney, Agent, or Firm*—Evenson, McKeown, Edwards & Lenahan, P.L.L.C.

[57] ABSTRACT

The invention provides a flow module comprising sandwiched plate elements, with at least one of each pair of adjacent plate element surfaces having a profiling which has a linear parallel construction so that a plurality of linear parallel flow ducts is formed between adjacent plate elements. These flow ducts can be charged with a first and a second fluid in an alternating manner by way of feeding and removal ducts formed by mutually aligned openings in the plate elements. To seal off the flow spaces and the feeding and removal ducts, seals are provided, and the openings for the feeding and removal ducts extend essentially across the whole end area of the profiling so that a distinct feeding and removal space is formed. According to the invention, for a mechanical stabilization several webs are arranged in the openings for the feeding and removal ducts in the profiled plate elements. These webs which are arranged in the inlet area or outlet area of the profiling end below the plate element surface.

24 Claims, 8 Drawing Sheets

FLOW MODULE

This application claims the priority of German priority document 196 17 396.5, the disclosure of which is expressly incorporated by reference herein.

BACKGROUND AND SUMMARY OF THE INVENTION

The invention relates to a flow module of the type used, for example, as plate heat exchangers for the heat exchange of two fluids.

A flow module in the form of a plate heat exchanger is described, for example, in European Patent Documents EP 0 578 933 A1, EP 0 203 213 A1 and EP 0 487 931 A1. These arrangements attempt to achieve a homogeneous or uniform flow over the plate area by means of high-expenditure structures of the profiling in the plate inflow and outflow areas. Such plate inflow and outflow profilings have the following disadvantages:

A significant pressure drop takes place over a small portion of the heat-exchanging surface in the plate inflow and outflow areas. Therefore, it is not used efficiently for implementing a flow over the whole plate which is as strong as possible.

A high pressure drop occurs, which requires a high pumping output.

The flow distribution in the plate inflow and outflow areas is very dependent on the flow rate and deteriorates considerably as the flow rate increases.

The same problems occur when, instead of being used as a heat exchanger, the flow module is used as a substance exchanger, in which each second plate is permeable for at least one of the two fluids, such as described for example, in Japanese Patent Document JP 1-230 991 A. The same is also true when it is used as a reactor, in which one of the two fluids is brought into a contact with a reactive substance (for example, a catalyst) by the coating of individual plates. In the latter case, the other fluid is used to temper the reactor, as described for example in German patent document DE 34 34 415 A1. (Note: the objects previously called "plates" are in the following generalized as "plate elements".)

An arrangement of the generic type described herein which solves the above-mentioned problems is disclosed in Japanese Patent Document JP 3-177 791 A. It comprises particularly a straight line parallel profiling, with openings in the individual plate elements for the feeding and removal ducts extending essentially across the whole end area of the profiling. Such a construction of the openings for the feeding and removal ducts is also known from German Patent Document DE-OS 15 01 617.

One disadvantage of these arrangements is that, because of the described construction of the openings for the feeding and removal ducts, when the system is operated under pressure, the peripheral longitudinal strips of the individual plate elements are pressed to the outside. This may destroy the arrangement. In addition, there is a danger of leaks because the seals arranged between the plate elements may be displaced.

It is therefore an object of the present invention to provide a flow module which maintains its stability in a pressure operation, without significant impairment of the flow characteristics in the plate inflow and plate outflow area.

This object is achieved by the flow module configuration according to the invention, in which the plate elements have a linear parallel profiling so that a flow space is formed in each case between two adjacent plate elements as a plurality of linear, parallel flow ducts, with the openings for the feeding and removal ducts of the two fluids extending essentially over the whole area of the profiling so that a distinct feeding and removal space is formed. According to the invention, for mechanical stabilization, several webs are provided in the openings for the feeding and removal ducts in the profiled plate elements, those ducts which are arranged in the inlet area or outlet area of the profiling ending, below the plate element surface.

In an advantageous construction, the cross-section of the feeding and removal ducts is larger than the sum of the cross-sections of the flow ducts existing between two adjacent plate elements. As mentioned above, the flow module according to the invention can be used as a heat exchanger, substance exchanger or reactor. Other applications are also possible, however.

Construction of the webs according to the invention yields an improved supply to the flow ducts, so that the whole surface can be utilized for the heat or substance exchange. In addition, lowering of the webs causes a mixing of the fluid proportions flowing between the individual webs.

As a result of the size and geometry of the feeding and removal space for the two participating fluids, the significant pressure drop in the profiled plate elements occurs almost uniformly along the whole length of the parallel flow ducts. This leads to a near maximum efficiency with respect to the heat exchange or substance exchange per addition of energy, as well as a very small size and a small mass so that a minimum of investment costs is required.

The arrangement according to the invention also achieves an increased surface-specific heat or substance exchange by way of the plate elements, while the fluid pressure drop is constant, so that the production costs are not increased.

The two participating fluids may be present in either a gaseous or a liquid form.

Elastomer seals are preferably used to seal off flow spaces and feeding and removal ducts. These may be integrated in grooves 26 extending in the plate elements, and such elastomer seals may advantageously be vulcanized, inserted or sprayed into the grooves. Of course, in addition to the elastomer seals, any other known sealing techniques may also be used, such as firm connections produced, for example, by welding, soldering or gluing.

Construction As a Heat Exchanger

In this construction, the profiled plate elements are made of materials which have a good thermal conductivity, such as metals and graphite. In this case, very low machining costs can be achieved by the use of simple manufacturing processes, such as punching the openings and stamping the profiling. In particular, the use of graphite foils as the plate elements, which are easily stamped, also permits the use of very caustic fluids, such as concentrated acids or lyes.

In the construction as a heat exchanger, plate elements can basically be used which are profiled on one side or on both sides. When plate elements which are profiled on both sides are used, a plate element which is smooth on both sides—that is, without any profiling over the whole plate element cross-section, is provided between each of the profiled plate elements. Another advantageous construction is achieved by using plate elements which are profiled only on one side.

In this embodiment, either liquid or gaseous fluids can basically be used for the primary and secondary side of the heat exchanger. Frequently, gas/gas heat exchangers or gas/liquid heat exchangers are required, in which the gas-side heat transfer determines the overall heat transfer. The homogenous flow distribution which is achieved by means of the arrangement according to the invention, permits the implementation of heat exchange with high specific performance.

Construction As a Substance Exchanger

In this construction, every second plate element is permeable so that it continuously permits a substance exchange between the two participating fluids. In particular, these permeable plate elements may be constructed as membranes or membrane combinations, such as composite membranes, in which case they will then be membrane modules. In this construction, each plate element which is profiled on both sides and impermeable to the substance will be followed by a membrane, which of course has no profiling.

By means of this module, different membrane processes, such as membrane distillation, pervaporation, pertraction and microfiltration can be carried out. The homogenous flow distribution of the fluids by way of the profiled plate element has a particularly advantageous effect on the separating output of the membrane modules. The plate construction permits the mounting of different membranes, such as porous hydrophilic membranes, porous hydrophobic membranes, dense membranes, asymmetric membranes and composite membranes. The flow module can be adapted to the respective application by the adaptation of the plate element as well as the form, material and hardness of the seal existing on the plate elements, and the geometry of the profiled plate surface. However, to realize a homogenous flow distribution along the whole flow surface of a profiled plate element (ideal case: drop-type flow), the cross-section of the fluid feeding or removal ducts must be larger than the sum of the cross-sections of the flow ducts.

Basically, liquid as well as gaseous fluids may be used for the permeate and the feed.

Construction As a Reactor

In this embodiment, individual surfaces of plate elements are coated with a reactive material, for example, a catalyst. These surfaces are selected such that one of the two fluids comes in contact with the reactive material on its path through the flow module. The reactor can basically be used analogously to the embodiment as a heat exchanger, with plate elements which are profiled on one side or on both sides. When plate elements profiled on both sides are used, a plate element which is not profiled on either side (for example, having a substantially smooth surface) is arranged between the respective profiled elements. Another advantageous embodiment is achieved by plate elements which are profiled only on one side.

The catalyst reacts with one of the fluids in the flow ducts (corresponding to the primary side of the heat exchanger). However, the flow ducts of the second fluid are free of the catalyst (corresponding to the secondary side of the heat exchanger). The second fluid is used for the tempering of the reactor.

The catalyst is applied to the plate elements which are arranged on the primary side, for example, by means of a thermal coating process. In many reactors, the largest part of the throughput takes place within the first third of the reactor, while most of the reactor length is required to convert the remaining reactants because of the insufficiently homogenous flow distribution. The flow distribution or the dwell time spectrum of the reactants influences the reactor size significantly. Since the construction according to the invention achieves a very homogenous flow distribution, it is particularly suitable for a use as a reactor.

Other objects, advantages and novel features of the present invention will become apparent from the following detailed description of the invention when considered in conjunction with the accompanying drawings.

DETAILED DESCRIPTION OF THE DRAWINGS

Figure 1:
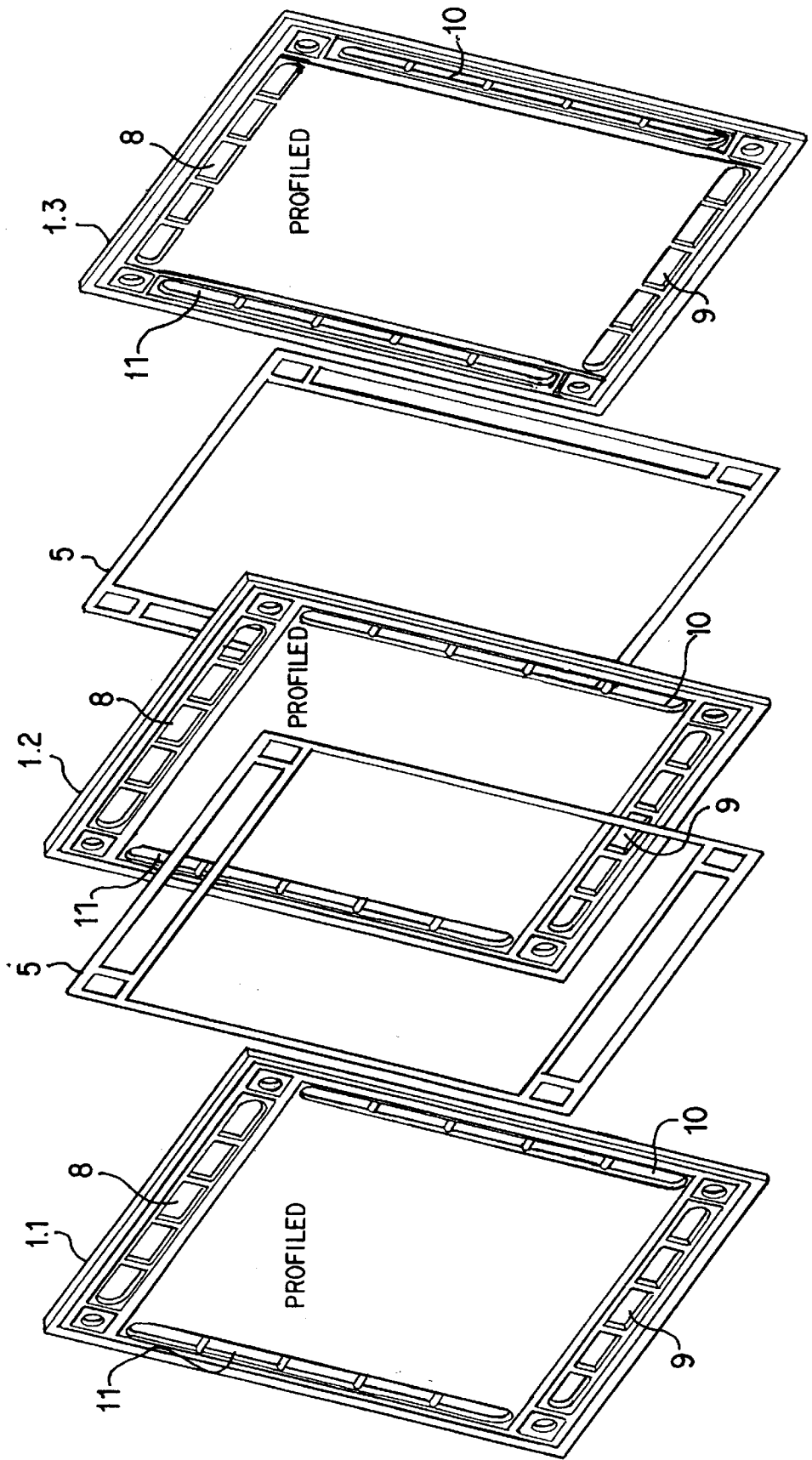
FIG. 1 is an exploded view of three plate elements of a flow module according to the invention, constructed as a plate heat exchanger.

FIG. 1 is an exploded, partially schematic view of a first example of a flow module according to the invention, in this case constructed as a heat exchanger. The arrangement comprises a plurality of plate elements 1.1 –1.3 made of a thermally conductive material, of which three are shown here. (Plate elements which have a profiling on at least one surface are sometimes hereinafter referred to as flow plates.) In the present case, each of the three plate elements 1.1–1.3 has a one-sided profiling (not shown in FIG. 1) which is situated on the surface of the plate elements facing the viewer.

Figure 2:
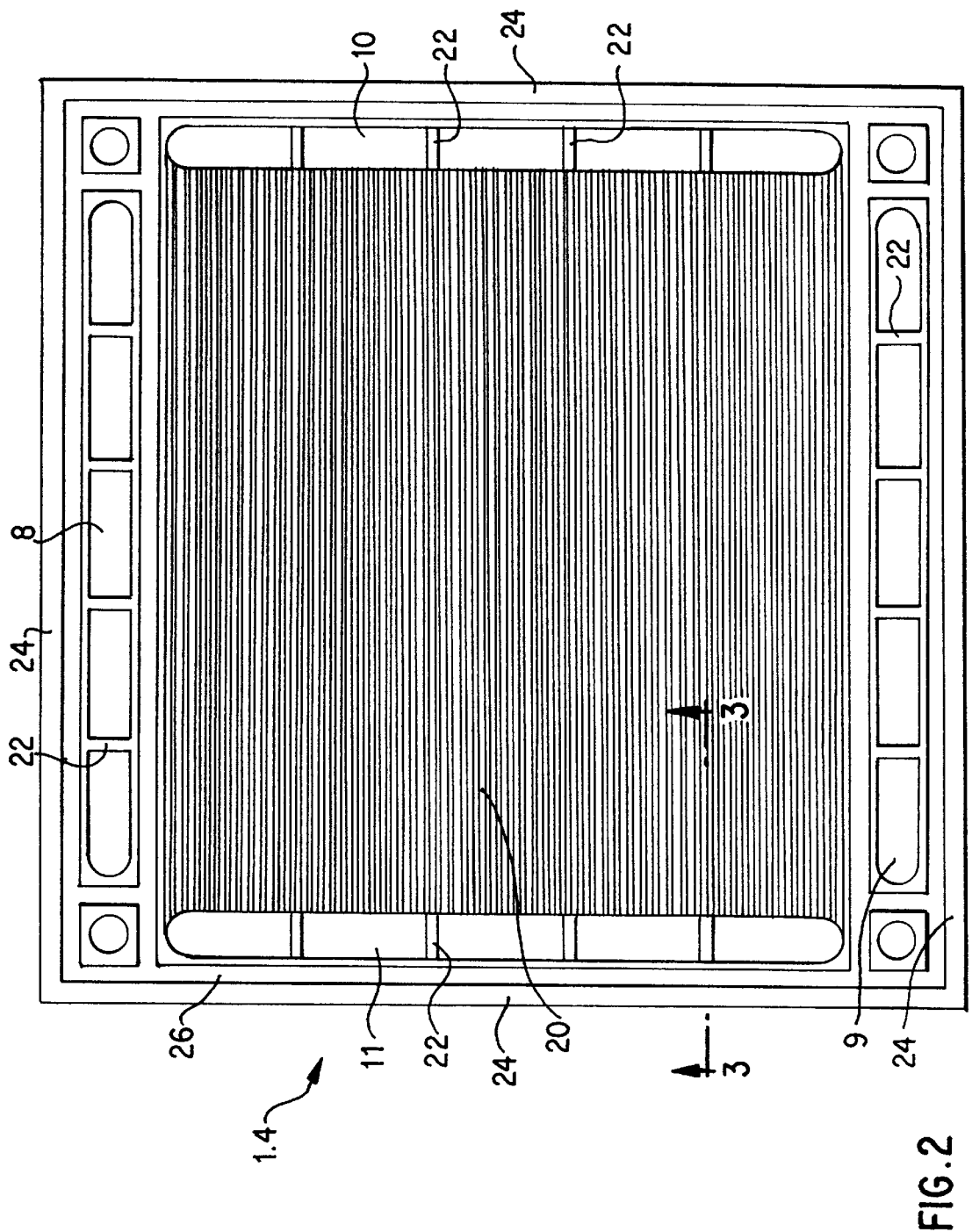
FIG. 2 is a single plate element with a profiled surface.

The profiling, which forms flow ducts for the participating fluids is shown in detail in FIG. 2. In this manner, flow spaces (consisting of the individual flow ducts in the profiled surface) are in each case formed between the surfaces of adjacent plate elements 1.1 and 1.2 or 1.2 and 1.3. These flow spaces between adjacent plate elements can be alternately charged with a first and a second fluid. Thus, the first fluid flows, for example, between the left plate element 1.1 and the center plate element 1.2, and the second fluid flows between the center plate element 1.2 and the right plate element 1.3. The first fluid will then again flow on the other side of the right plate element 1.3, etc.

The feeding and removal ducts for the two fluids are formed by mutually aligned openings 8, 9, 10, 11 at the edges of the respective plate elements 1.1–1.3. In the construction illustrated here, each of the four openings is provided with several webs 22 for mechanical stabilization. The two openings 10, 11 on the left and right edges are provided for the feeding and removal of the first fluid, while the two openings 8, 9 on the upper and lower edges are provided for the feeding and removal of the second fluid. Corresponding to this position of the openings for the feeding and removal of the two fluids, the flow ducts are each rotated by 90° with respect to one another, from one plate element to the next. In order to ensure alternate changing with fluid 1 and fluid 2, the two seals 5 have a correspondingly different construction. In the arrangement of seals 5 and plate elements 1.1 to 1.3 shown here, the linear profiling in the left plate element 1.1 and the right plate element 1.3 extends in parallel to the upper or lower edge and in the center plate element 1.2 in parallel to the left or right edge.

To assure reliable sealing and to minimize production costs, surrounding seals inserted between adjacent plate elements are integrated in a surrounding groove of the plate element surface. These may be prefabricated elastomer seals, which are inserted into the sealing grooves. Elastomer seals may also be sprayed in directly, so that a firm connection is created between the seal and the plate element, thereby reducing the mounting expenditures considerably.

The feeding and removal ducts are connected with exterior feeding and removal lines by way of flanges, which are not shown. In order to achieve the desired uniform flow distribution over the whole profiled areas of the plate elements, the guiding of the fluid through the exterior feeding and removal lines must take place with a pressure loss which is as low as possible and with a uniform flow distribution. Structurally, this is achieved by providing large flow cross-sections in the area of the feeding and removal ducts of the flanges, which have recesses in the area of the feeding and removal ducts. In addition, a uniform guiding of the flow can be achieved by means of an intermediate plate which is arranged between the flange and the first plate element or between the flange and the last plate element.

Figure 4:
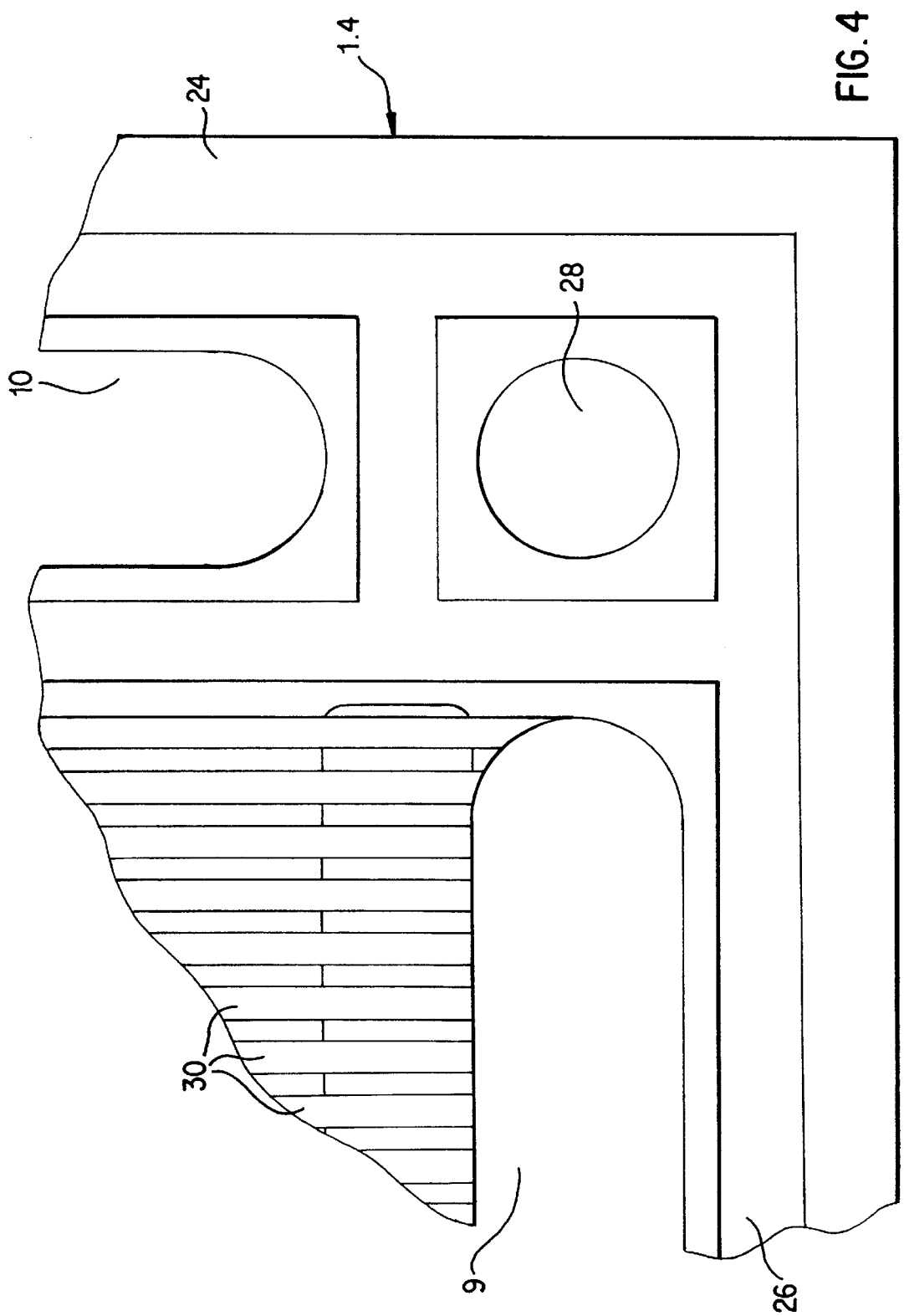
FIG. 4 is a view of a detail from FIG. 2.

FIG. 2 is a plan view of an individual profiled plate element 1.4 such as can be used not only in the flow module according to FIG. 1, but also in other embodiments of the invention (for example, a substance exchanger, a reactor). The largest portion of the surface is taken up by the profiled area 20. The profiling forms linear, parallel flow ducts 30 (FIG. 4). The openings 8, 9, 10, 11 for the feeding and removal of the two fluids are arranged on the edges. Being aligned above one another, the openings 8, 9, 10, 11 of adjacent flow plates form feeding and removal ducts. On the right edge, the opening 10 for the feeding of the first fluid is situated ; and the openings 11 for the removal of the first fluid is situated on the opposite left edge. In its path between the feeding duct and the removal duct, the first fluid flows through the flow ducts of the profiling illustrated in the figures. The openings extend along the entire edge of the plate elements, across the whole area of the profiling (transversely to the flow ducts) so that a distinct feeding and removal space for the fluid is formed.

The opening 8 for the feeding of the second fluid is situated on the upper edge; and the opening for the removal of the second fluid is situated on the opposite lower edge 9. This second fluid flows in the profiling of the plate element adjacent to the illustrated plate element.

The surrounding groove 26 seals feeding and removal ducts to the outside, as well as with respect to the flow spaces between adjacent plate elements.

According to the invention, the webs 22 are provided in the openings for the feedings and removal spaces, for mechanical stabilization, because the fluid pressure in the feeding and removal ducts tends to press the longitudinal strips 24 of the plate element toward the outside. The number of the webs 22, which are arranged between the longitudinal strips 24 and the profiled area 20 of the plate element, and their width can be adapted specifically to the mechanical requirements. The surfaces of the webs, which are arranged in the inlet area or the outlet area of the profiling, (here therefore the webs in the openings 10 and 11), end slightly below the profiled plate surface (approximately on the lower level of the profiling). This permits an improved supply of the flow ducts in the web area in order to utilize the whole surface for the heat exchanger or substance exchanger. In addition, this lowering of the webs permits a mixing of the fluid proportions flowing between the individual webs in a stacked module. The construction of the webs 22 is shown in detail in FIG. 3.

A wide variety of materials can be used for the flow plates. However, plate constructions of metal, plastic or graphite were found to be particularly advantageous with respect to output data and production costs. These materials can be shaped or machined to produce the profiling and the grooves for the seals by means of simple and low-cost manufacturing processes, such as soft stamping/punching, injection molding, etc. However, cutting processes may also be used.

In the illustrated example, the profiled plate element 1.4 has a rectangular surface area. This permits homogenous feeding and removal of the fluid by way of the openings, without separate flow distributors, all flow ducts of a plate surface being connected directly with the plate opening.

Figure 3:
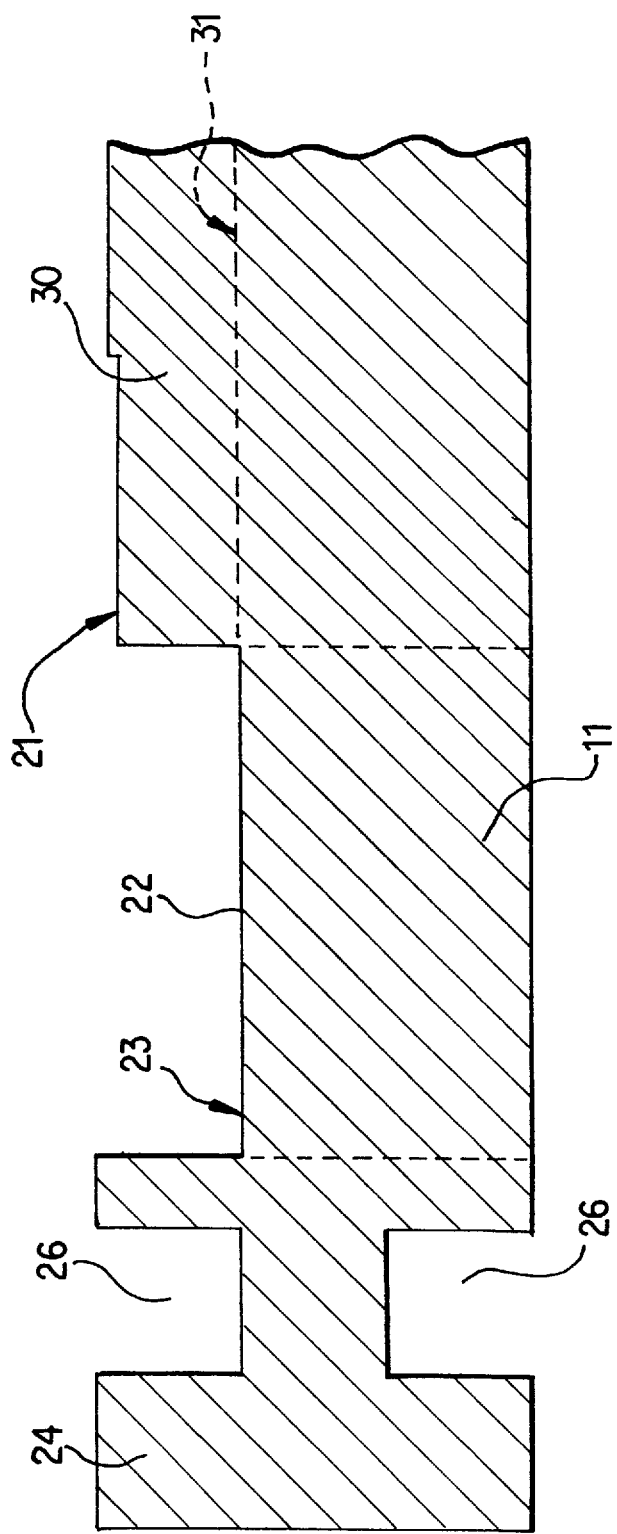
FIG. 3 is a sectional representation of the plate element according to FIG. 2 (section line AA in FIG. 2)

FIG. 3 is a cross-sectional representation of the plate element 1.4 according to FIG. 2 (sectional view along Line AA in FIG. 2). It shows that the web 22 ends below the plate element surface 21, specifically at the level of the bottom 31 of the ducts 30. The surface 23 of the web 22 and the bottom 31 of the ducts 30 therefore change into one another in a continuous manner. The reference numbers 24, 26, 11 indicate the same components as in FIG. 2.

FIG. 4 shows a detail of the plate element 1.4 according to FIG. 2. It illustrates the flow ducts 30 on the plate element surface as well as the openings 10.9 for the feeding of the one fluid and the removal of the other fluid. The surrounding groove 26 is provided for the integration of the surrounding seal. In the outer corner of the plate element, a bore 28 for the tie rods is situated by means of which the plate elements which are situated above one another or side-by-side, can be pressed against one another.

Figure 5:
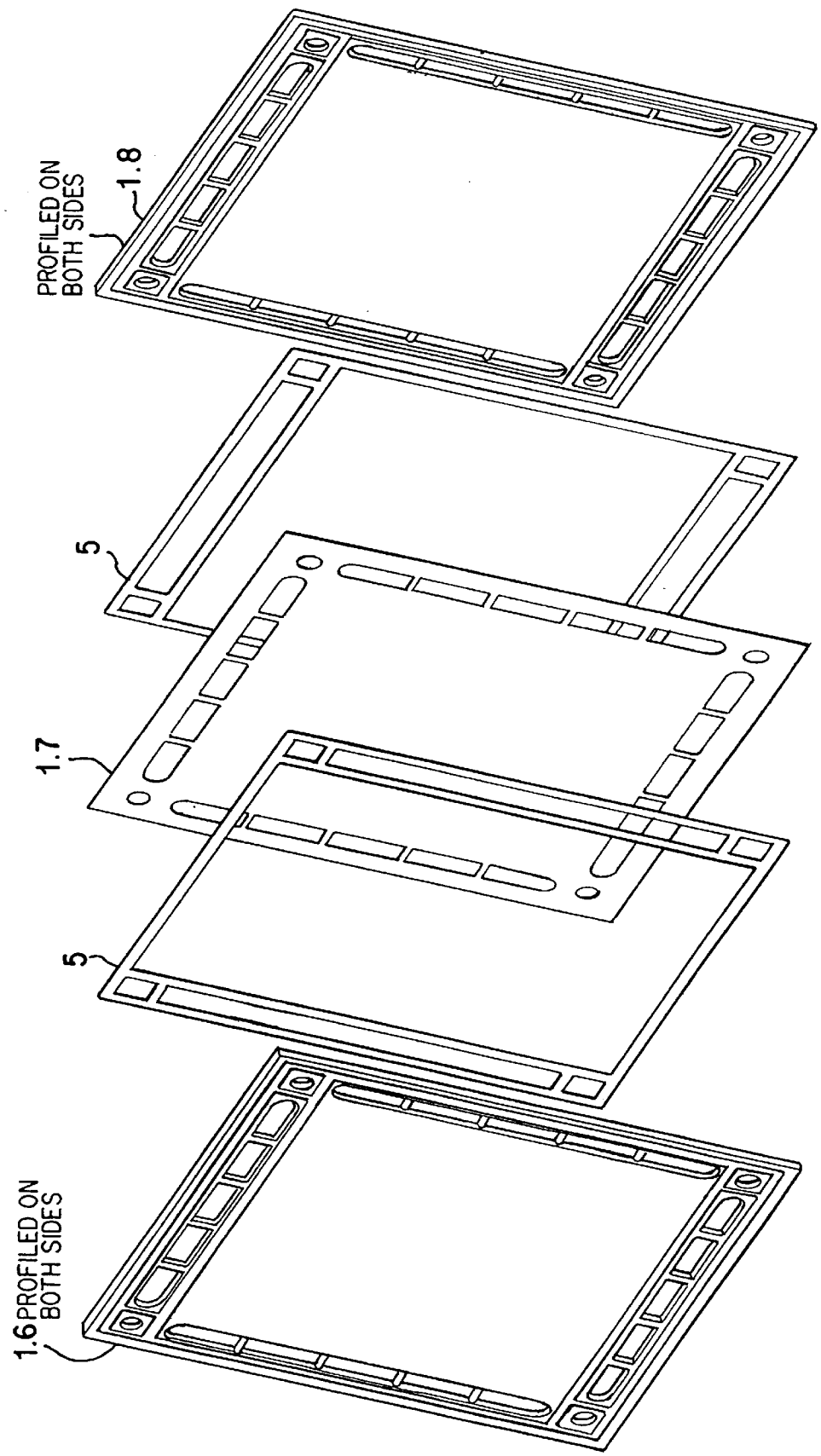
FIG. 5 is an exploded view of a flow module according to the invention, constructed as a plate heat exchanger.

FIG. 5 shows another embodiment of the invention which is constructed as a heat exchanger. Differing from FIG. 1, the two exterior plate elements 1.6, 1.8 are profiled on both surfaces, while the center plate element 1.7 has a smooth surface on both sides and is constructed as a dense foil. Otherwise, this embodiment corresponds to that illustrated in FIG. 1.

Figure 6:
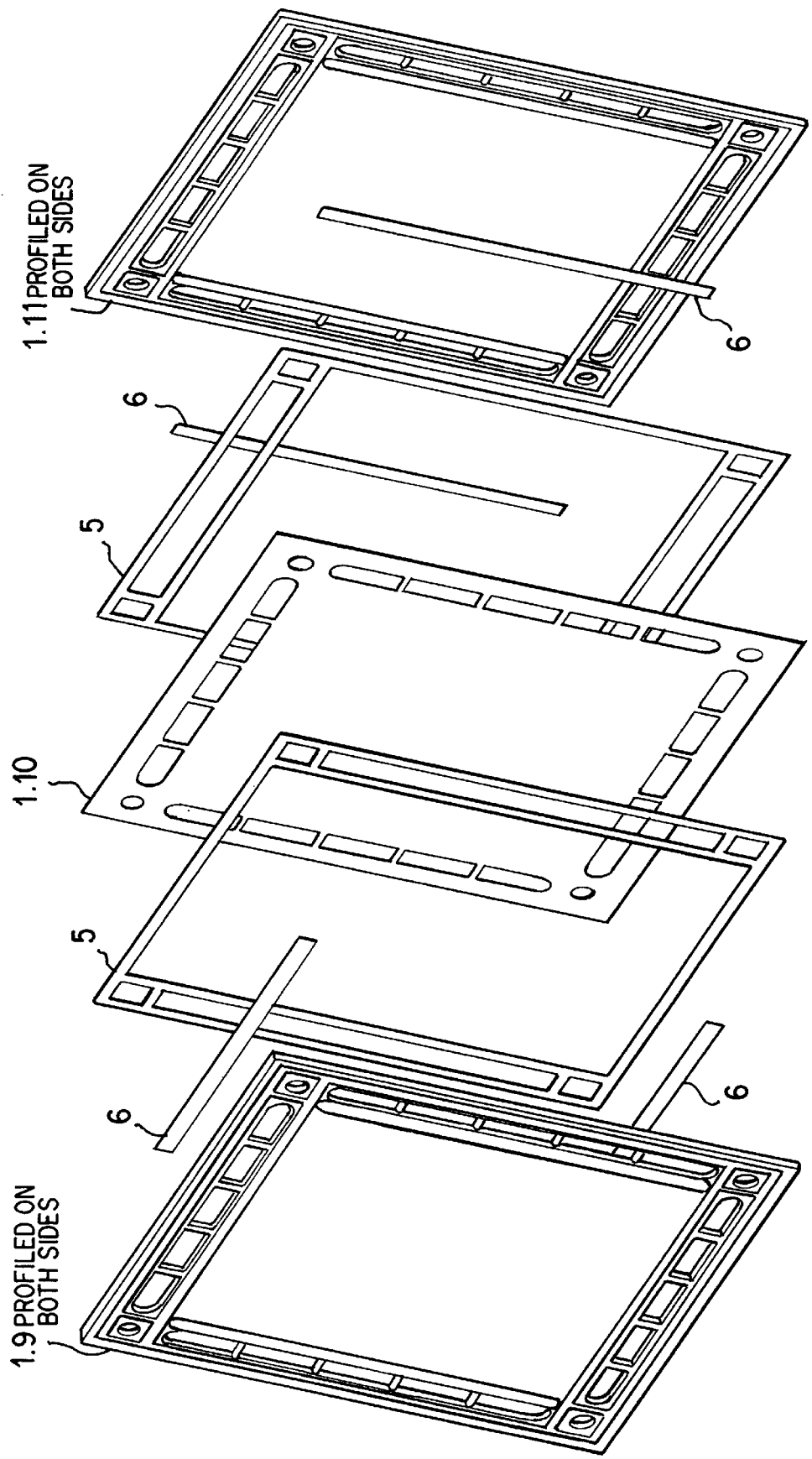
FIG. 6 is an exploded view of a flow module according to the invention, constructed as a substance heat exchanger.

FIG. 6 illustrates an embodiment constructed as a membrane module. Three plate elements 1.9–1.11 are shown, the two outside plate elements 1.9, 1.11 being dense flow plates which are profiled on both sides. The center plate element 1.10 is constructed as a membrane which permits a substance exchange of the two fluids adjoining the membrane.

In the respective inlet area and outlet area of the flow ducts, a supporting plate 6 is arranged to support the adjacent seal 5, and also to prevent entry of the membrane 1.10 into the flow ducts. In addition, the integration of the supporting plate achieves a reliable seal.

Figure 7:
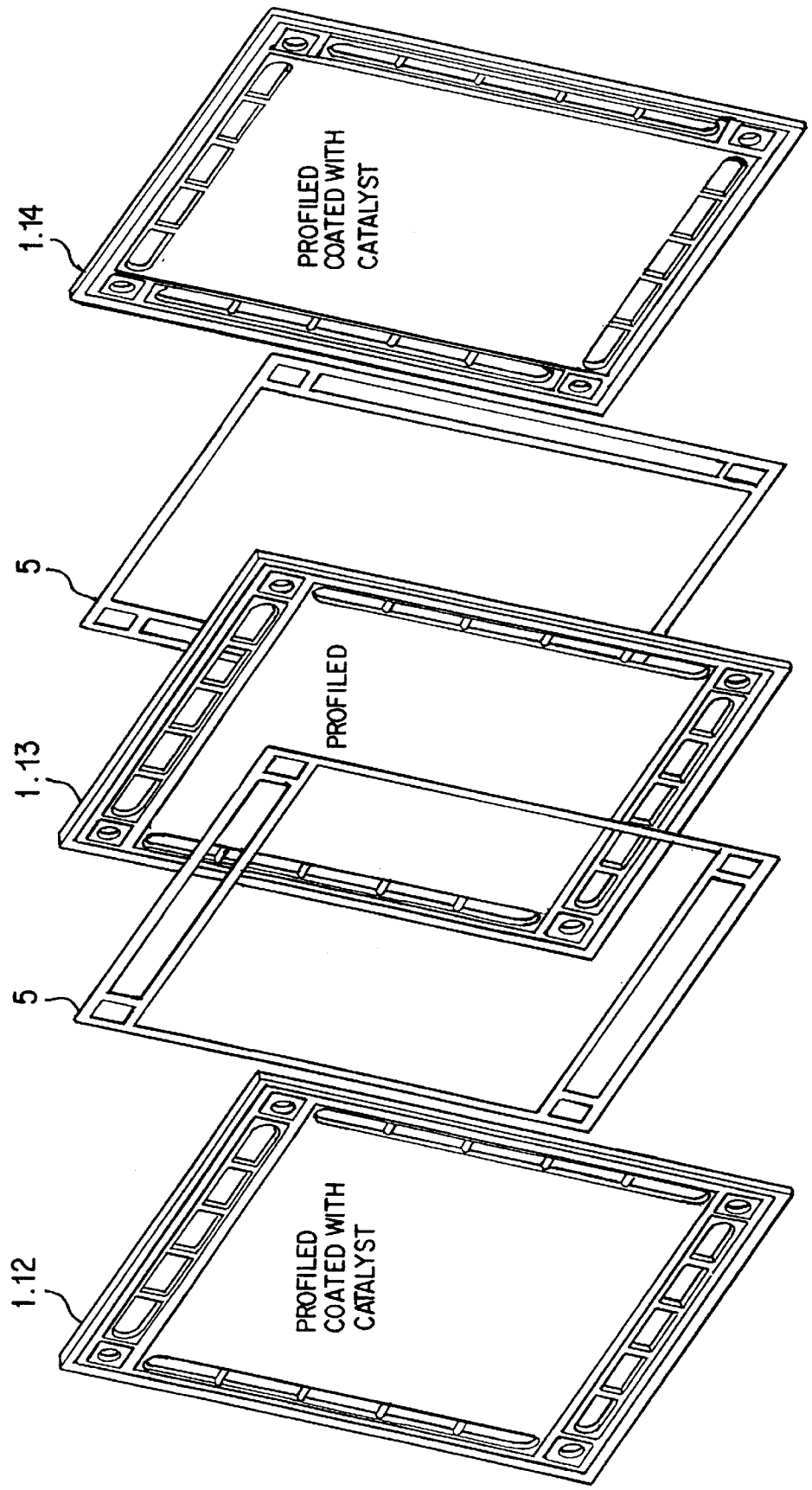
FIG. 7 and 8 are an exploded view of one flow module respectively according to the invention, constructed as a reactor.

FIG. 7 shows a reactor constructed according to the invention. Each of the three illustrated plate elements 1.12–1.14 is profiled on one side (facing the viewer). The profiled surfaces of the two outer plate elements 1.12, 1.14 are coated with a catalyst, while the center plate element 1.13 has no catalyst coating. Therefore, in this arrangement, only the fluid (reactant) which is situated between the center 1.13 plate element and the right 1.14 plate element as well as on the visible side of the left plate element 1.12 comes in contact with the catalyst, while the other fluid (heat carrier) which is situated between the left and center plate elements 1.12, 1.13 as well as on the hidden side of the right plate element 1.14, has no contact with the catalyst.

Figure 8:
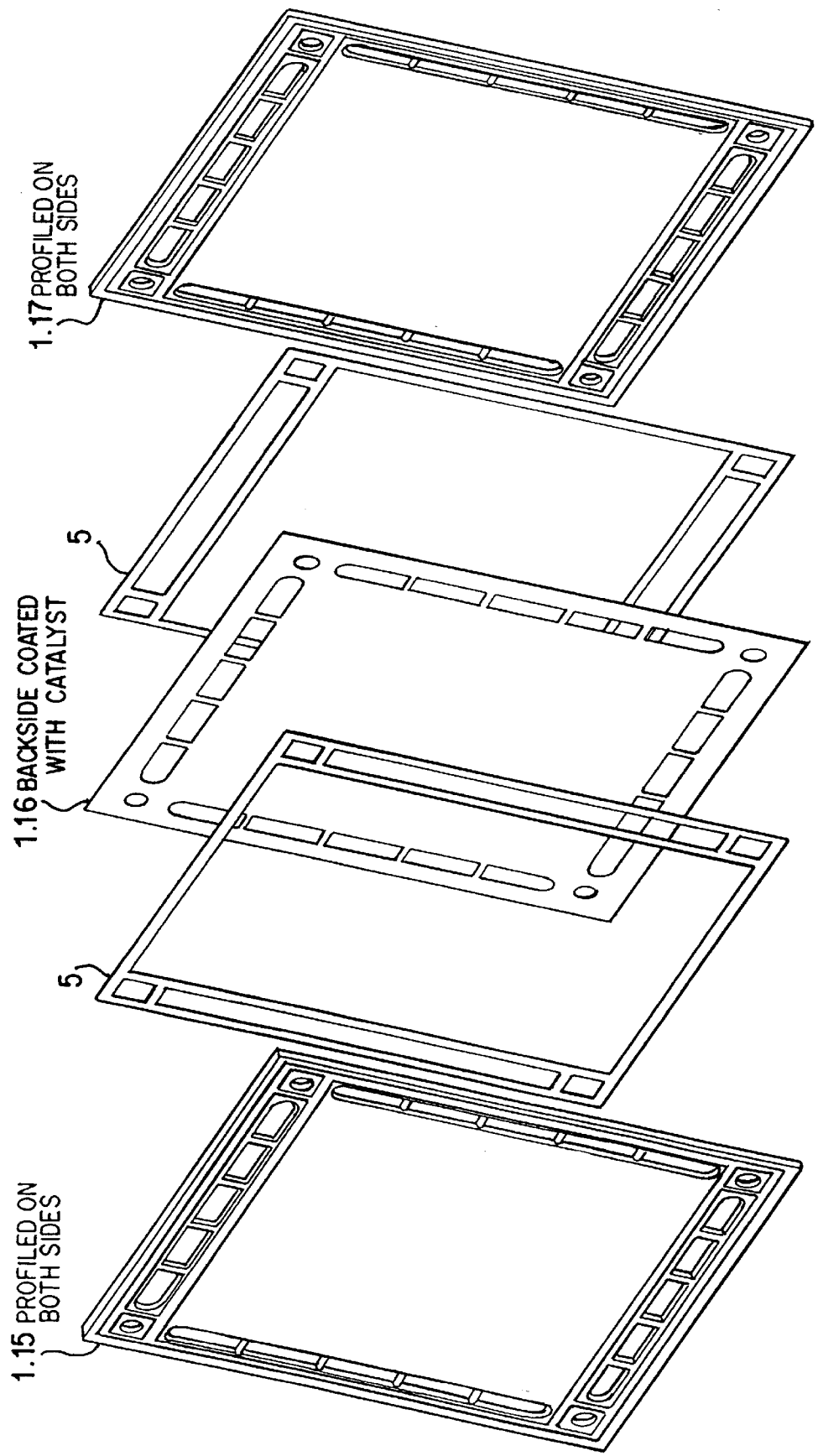

FIG. 8 shows another reactor constructed according to the invention. The two outer plate elements 1.15, 1.17 are profiled on both sides but have no catalyst coating. The center plate element 1.16 is constructed as a dense foil, the side facing away from the viewer being coated with a catalyst. In this arrangement, only the fluid (reactant) which is situated between the center plate element 1.16 and the right plate element 1.17 and that which is on the visible side of the left plate element 1.15 is in contact with the catalyst, while the other fluid (heat carrier) which is situated between the left 1.15 and the center 1.16 plate module as well as on the hidden side of the right plate element 1.17, has no contact with the catalyst.

All embodiments illustrated in FIGS. 1 as well as 5 to 8 have in common that exactly one of any two mutually opposite surfaces of adjacent plate elements has a profiling. In most cases, such profiling will be the most favorable solution with respect to manufacturing techniques, but it is of course possible that both surfaces are provided with an identical profiling which, in particular, are aligned above one another.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A flow module comprising:
   a plurality of adjacent plate elements;
   at least one of each pair of mutually opposite surfaces of adjacent plate elements having a profiled surface contour formed by a plurality of parallel linear grooves therein, providing a plurality of parallel linear flow ducts in said surface, defined by said grooves and by a mutually opposite surface of the adjacent plate element;
   a plurality of feeding and removal ducts for alternately charging flow ducts between adjacent surfaces of consecutive pairs of plate elements with first and second fluids, said feeding and removal ducts being formed by mutually aligned openings in respective plate elements, which openings extend across substantially an entire end area of said flow ducts, whereby separate feeding and removal spaces are formed;
   a plurality of seals which seal the flow ducts and feeding and removal ducts; and
   a plurality of webs arranged in the openings which form the feeding and removal ducts in the respective plate elements, a surface of said webs being aligned below the surface of said respective plate elements.

2. Flow module according to claim 1 wherein each second plate element comprises a membrane which permits a substance exchange between the first and second fluids.

3. Flow module according to claim 1 wherein surfaces of individual plate elements which contact one of said first and second fluids are coated with a reactive material.

4. Flow module according to claim 3 wherein said reactive material is a catalyst.

5. Flow module according to claim 1 wherein a single one of each pair of mutually opposite surfaces of adjacent plate elements has a profiling.

6. Flow module according to claim 5 wherein each of said plate elements has a profile on one side thereof.

7. Flow module according to claim 6 wherein each second consecutive plate element is coated with a reactive material on its profiling.

8. Flow module according to claim 5 wherein each second consecutive plate element is profiled on both sides, and others of said plate elements have no profiling on either side.

9. Flow module according to claim 8 wherein the plate elements which have no profiling on either side comprise foils.

10. Flow module according to claim 8 wherein the plate elements which have no profiling on either side are coated on one side with a reactive material, whereby one of said first and second fluids is brought in contact with the reactive material.

11. Flow module according to claim 10 wherein the plate elements which have no profiling on either side and are coated on one side with a reactive material comprise foils.

12. Flow module according to claim 8 wherein the plate elements which have no profiling are membranes which permit a substance exchange between the first and second fluids.

13. Flow module according to claim 1 wherein a cross-section of the feeding or removal ducts has an area which is larger than a sum of cross-sectional areas of the flow ducts between two adjacent plate elements.

14. Flow module according to claim 1 wherein a pressure drop ratio exists between a pressure drop of the profiling and a pressure drop by way of the feeding and removal space, which pressure drop ratio is >10, whereby a uniform distribution of the fluids exists by way of the profiling of one or several plate elements.

15. Flow module according to claim 1 whereby flow ducts for the respective first and second fluids are rotated with respect to one another by approximately 90°.

16. Flow module according to claim 1 wherein the feeding and removal ducts are connected by flanges with external feeding and removal lines, the flanges having recesses in the area of the feeding and removal ducts for reducing the pressure drop.

17. Flow module according to claim 1 wherein the plate elements are made of a material selected from the group consisting of plastic, metal and graphite.

18. Flow module according to claim 1 wherein the plate elements are rectangular.

19. Flow module according to claim 1 wherein the seals are elastomer seals which are integrated in grooves in the plate elements.

20. Flow module according to claim 1 wherein the grooves surround a periphery of the plate element.

21. Flow module according to claim 19 wherein the elastomer seals are installed by one of vulcanization, insertion and spraying into the grooves.

22. Flow module according to claim 1 wherein the profiling of the plate elements produced by a process selected from the group consisting of stamping of foils, injection molding, soft stamping, punching and cutting.

23. Flow module according to claim 22 wherein said foils are made of a material selected from the group consisting of metal and graphite.

24. Flow module according to claim 1 wherein the inlet and outlet area of the profiling is provided with a supporting plate which supports the adjacent seal.

* * * * *